(12) United States Patent
Klos et al.

(10) Patent No.: US 7,596,083 B2
(45) Date of Patent: Sep. 29, 2009

(54) NETWORK ELEMENT RECOVERY PROCESS

(75) Inventors: Timothy R Klos, High Ridge, MO (US); John Vallely, Florissant, MO (US); Cynthia Green, Carol Stream, IL (US); Randall Leet, Eureka, MO (US); Gary Martens, Florissant, MO (US); Craig Milloshewski, Waterloo, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 645 days.

(21) Appl. No.: 11/289,489

(22) Filed: Nov. 30, 2005

(65) Prior Publication Data

US 2007/0121487 A1 May 31, 2007

(51) Int. Cl.
*G01R 31/08* (2006.01)
(52) U.S. Cl. .................................. 370/216; 370/252
(58) Field of Classification Search ............... 370/216, 370/244, 242, 252
See application file for complete search history.

(56) References Cited

U.S. PATENT DOCUMENTS

| | | | |
|---|---|---|---|
| 6,078,930 A * | 6/2000 | Lee et al. .................... 707/202 |
| 6,167,025 A * | 12/2000 | Hsing et al. ................. 370/216 |
| 6,295,275 B1 * | 9/2001 | Croslin ....................... 370/216 |
| 6,912,221 B1 * | 6/2005 | Zadikian et al. ......... 370/395.21 |
| 2002/0168054 A1 * | 11/2002 | Klos et al. ................. 379/1.04 |
| 2004/0196783 A1 * | 10/2004 | Shinomiya .................. 370/216 |
| 2005/0111350 A1 * | 5/2005 | Kano .......................... 370/216 |
| 2005/0188242 A1 * | 8/2005 | Rabbat et al. ................... 714/4 |
| 2005/0237925 A1 * | 10/2005 | Taylor et al. ................ 370/216 |
| 2006/0203716 A1 * | 9/2006 | Gilligan ...................... 370/216 |

\* cited by examiner

*Primary Examiner*—Kwang B Yao
*Assistant Examiner*—Candal Elpenord
(74) *Attorney, Agent, or Firm*—Greenblum & Bernstein, P.L.C.

(57) ABSTRACT

A method for recovering circuits of a network element in a communications network includes determining a recovery interval in response to a failure occurring in the network element, and collecting recovery data relating to at least one circuit provisioned in the network element during the recovery interval to support a network service. The recovery data includes identification data and provisioning data. A connection with the network element is established based on the identification data, and the circuit is reprovisioned based on the provisioning data. The method may also include detecting whether an error occurred while reprovisioning the circuit, and logging any detected errors.

21 Claims, 5 Drawing Sheets

NETWORK ELEMENT RECOVERY PROCESS

BACKGROUND OF THE INVENTION

1. Field of the Disclosure

The present disclosure relates to provisioning network services. More particularly, the present disclosure relates to recovering provisioned services in network elements after a full or partial failure of the network element.

2. Background Information

In a data or voice communications network, various network elements (NE), such as a remote terminal (RT) or an optical concentrator device (OCD) used to implement digital subscriber line (DSL) services, periodically fail, for example, due to a power disruption or failure. This requires replacement and/or recovery of the respective circuits that had been provisioned in the NEs prior to the failure. Typically, the circuits may be recovered using backup information maintained by another network device, such as an element management system (EMS) that originally provisioned the circuits or that contains complete provisioning data despite the failure. For example, an EMS may be updated with circuit information from the NE on a periodic basis by uploading the information from the NE, essentially providing back-up data for the NE. If all circuit information was uploaded prior to the failure, the recovery process can be performed by the EMS. However, updates to the NE circuits occurring after the most recent information upload to the EMS will not be contained in the EMS, and will be lost should the NE fail before the next upload (or other backup) occurs.

In a network that provides DSL services, recovering lost circuits is tantamount to reprovisioning each circuit in the same manner as originally done. For example, the reprovisioning requires determining the facility to provision, determining the endpoint information and building the corresponding logical cross-connects, and determining and provisioning the discrete multi-tone (DMT) parameters defining the service. The DMT parameters include, for example, data speeds, noise margins, channel interleave delays, and power spectral densities. For circuits having information not in the EMS, the process of recovery must be performed manually. This is done, for example, using a graphical user interface (GUI) or a command line interface (CLI) to the EMS. Such a manual recovery is time consuming, inefficient and error prone, especially where the number of NEs and/or circuits that must be recovered is large. Further, data used for the recovery must be retrieved from the system that originally provisioned the affected circuits, which also must be done manually.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

The present disclosure relates to a recovery program that communicates with the various network elements of a communications network, and fully or partially reprovisions the circuits within the failed NEs, to the extent necessary. The disclosure enables recovery of circuits provisioned after the respective NEs have been most recently backed up.

In view of the foregoing, the present disclosure, through one or more of its various aspects, embodiments and/or specific features or sub-components, is thus intended to bring out one or more of the advantages as specifically noted below.

An aspect of the present disclosure provides a method for recovering circuits of a network element in a communications network, which includes determining a recovery interval in response to a failure occurring in the network element, and collecting recovery data relating to at least one circuit provisioned in the network element during the recovery interval to support a network service. The recovery data includes identification data and provisioning data. A connection with the network element is established based on the identification data, and the circuit is reprovisioned based on the provisioning data. The method may also include detecting whether an error occurred while reprovisioning the circuit, and logging any detected errors. Also, the method may include confirming that preexisting provisioning data relating to the circuit is not in the network element prior to reprovisioning, and reprovisioning the circuit when the preexisting provisioning data is not already in the network element.

The recovery interval may be determined by determining a time of the failure, determining a time of the most recent back-up of the network element, and identifying the recovery interval as a time period between the most recent back-up and the time of the failure. Collecting recovery data relating to the circuit may include retrieving the provisioning data from multiple databases in the communications network.

Also, the provisioning data may include a set of discrete multi-tone (DMT) parameters defining the service and cross-connection data defining a plurality of ports on the network element. Accordingly, reprovisioning the circuit may include reprovisioning the set of DMT parameters, the cross-connection data, or both. The identification data may include an address of a controlling network element, such as a central office terminal (COT) or an EMS, that implements provisioning of the network element. The controlling network element address may be an IP address. Accordingly, establishing the connection with the network element may include establishing a Telnet session with the controlling network element using the IP address.

Another aspect of the present disclosure provides a method for recovering provisioned services in at least one network element that experienced a failure. The method includes retrieving recovery data from a recovery database relating to multiple circuits provisioned in a portion of the network element during a recovery interval. The recovery data includes identification data and provisioning data collected from at least one network provisioning database and stored in the recovery database in response to the failure. A connection is established with the network element, through an associated controlling network element, based on the identification data, and at least a portion of the circuits are reprovisioned based on the provisioning data. The method may further include grouping the circuits to be recovered in accordance with an IP address of the controlling network element, and reprovisioning the plurality of circuits during a Telnet session.

The provisioning data may be at least one of a set of DMT parameters and cross-connection data for each of the circuits. Reprovisioning the portion of the circuits my thus include reprovisioning the set of DMT parameters, the cross-connection data, or both. Also, the portion of the network element may include a shelf or a card within the network element.

Another aspect of the present disclosure provides a computer readable medium storing a computer program for recovering provisioned services in at least one network element that experienced a failure. The computer readable medium includes a retrieving code segment that retrieves recovery data from a recovery database relating to multiple circuits provisioned in a portion of the network element during a recovery interval. The recovery data includes identification data and provisioning data collected from at least one network provisioning database and stored in the recovery database in response to the failure. The computer readable medium also includes a connecting code segment that establishes a connection with the network element, through an associated controlling network element, based on the identification data; and a reprovisioning code segment that reprovisions at least a portion of the circuits based on the provisioning data. The connecting code segment may establish the connection with the controlling network element though a Telnet session using the identification data. The computer readable medium may also include a grouping code segment that groups the circuits to be recovered in accordance with the identification data relating to the controlling network element, where the reprovisioning code segment reprovisions the grouped circuits during the Telnet session.

Yet another aspect of the present disclosure provides a system for recovering failed network elements in a communications network, including a first database of information representing multiple existing subscriber circuits, and a second database of information representing multiple profiles that define corresponding services, which correspond to the circuits. The system also includes a first processor that retrieves recovery information from the first and second databases in response to a failure of a network element, and that writes the recovery information to a third database. The recovery information corresponds to at least one circuit provisioned in the network element during a recovery interval. The system also includes a second processor that retrieves the recovery information from the third database, establishes a communication session with the network element, and reprovisions the circuits in accordance with the recovery information.

The various aspects and embodiments of the present disclosure are described in detail below.

Figure 1:
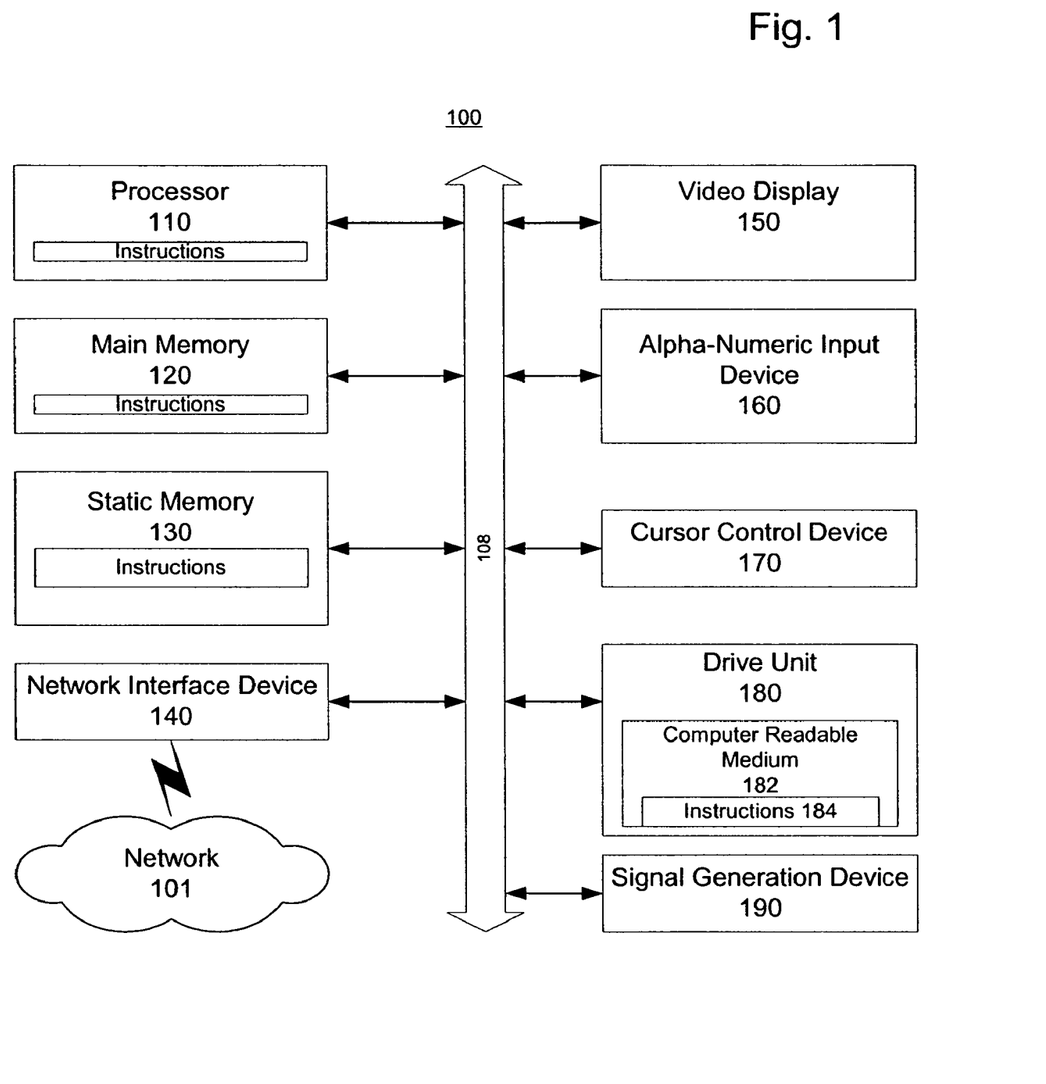
FIG. 1 shows an exemplary general computer system that includes a set of instructions for performing processing, according to an aspect of the present disclosure.

Referring to FIG. 1, a description is now provided of an illustrative embodiment of a general computer system 100, on which the network recovery process can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Figure 2:
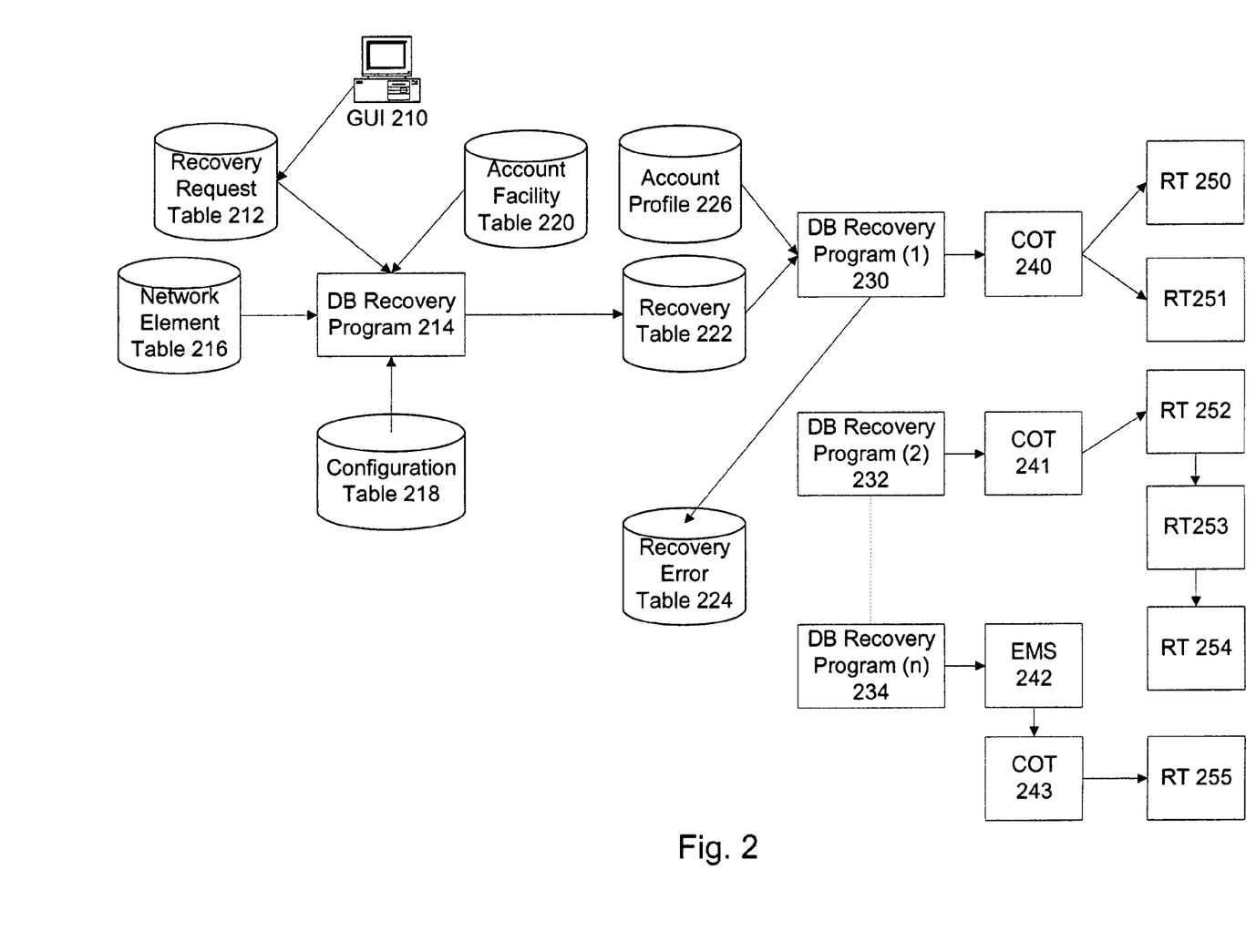
FIG. 2 shows an exemplary network architecture for implementing a network element recovery process, according to an aspect of the present disclosure.

Using a general computer system as shown in FIG. 1, a network element recovery process may be provided. The system of FIG. 1 can also operate as various elements with the network, including a GUI, a CLI, an EMS, an RT, a server, a central office terminal (COT), or the like, processing according to an aspect of the present disclosure, as indicated, for example, in FIG. 2. More particularly, FIG. 2 depicts an exemplary network architecture for implementing the network element recovery process, and includes a GUI 210 and a Database Recovery Program 214, as well as multiple Recovery Utilities, including Recovery Utility (1) 230, Recovery Utility (2) 232 through Recovery Utility (n) 234. FIG. 2 further depicts a number of exemplary databases used to provide and/or store data relating to the reprovisioning, including the Recovery Request Table 212, the Network Element Table 216, the Configuration Table 218, an Account Facility Table 220, a Recovery Table 222, a Recovery Error Table 224 and an Account Profile Table 226, each of which is described in detail below. These databases may be distributed or implemented in any combination within one server or multiple servers or similar computers, without affecting the scope or spirit of the present disclosure. Further, the Recovery Error Table 224 may likewise be configured to communicate directly with each of the recovery utilities, e.g., Recovery Utility (2) 232 through Recovery Utility (n) 234.

In the depicted embodiment, it is assumed that circuits have been provisioned to support DSL services, including asymmetric DSL (ADSL), designed for fast downstream requirements, such as Internet access, and symmetric DSL (SDSL, HDSL), designed for high speed in both directions. The representative NEs include the remote terminals RT 250 and RT 251, provisioned through the COT 240; RT 252, RT 253 and RT 254, which are chained to one another and provisioned through the COT 241; and RT 255 which is provisioned through the COT 243. Although each of the COTs has a corresponding EMS, only EMS 242 is actually shown in FIG. 2, indicating an aspect of the present disclosure in which circuit recovery (of the RT 255) is performed by communicating with EMS 242 as the controlling network element, as opposed to communicating directly with the COT 242 as the controlling network element. Any type of comparable controlling network element device may be used to implement the network recovery, without affecting the scope or spirit of the present disclosure.

The network element recovery process is implemented, for example, by a network or DSL service provider, in response to notification that a NE, such as the RT 250, has experienced a failure in all or a portion of its circuits. Step s310 of FIG. 3 indicates receipt of the failure notification, as well as the time of the failure. The failure notification and the time of the failure may be received, and the recovery process may be initiated, for example, at the GUI 210 in FIG. 2. Further, the GUI 210 may be used to view detailed information related to the provisioning failures, and to initiate the recovery process. To initiate recovery according to an embodiment, a record is written to the Recovery Request Table 212, which causes a database trigger to execute, which determines the circuits to be recovered, as discussed below. In an alternative embodiment, the recovery may be initiated using a command line interface (CLI) (not pictured).

In an embodiment, the failed NE is identified, for example, by its target identifier (TID), which is based on the common language location identifier (CLLI) code. CLLI is used generally to identify specific switching equipment and the respective physical location. The CLLI code is an 11 character alphanumeric code, maintained by Telcordia Technologies, Inc. For example, the first four characters identify a city, the fifth and sixth characters identify a state, the seventh and eighth characters identify a particular location within the city, and the last three characters are unique to the specific network element situated at that location. Any manner of receiving failure notification and identifying the affected NE may be incorporated into the various embodiments, and does not affect the scope or spirit of the disclosure.

Figure 3:
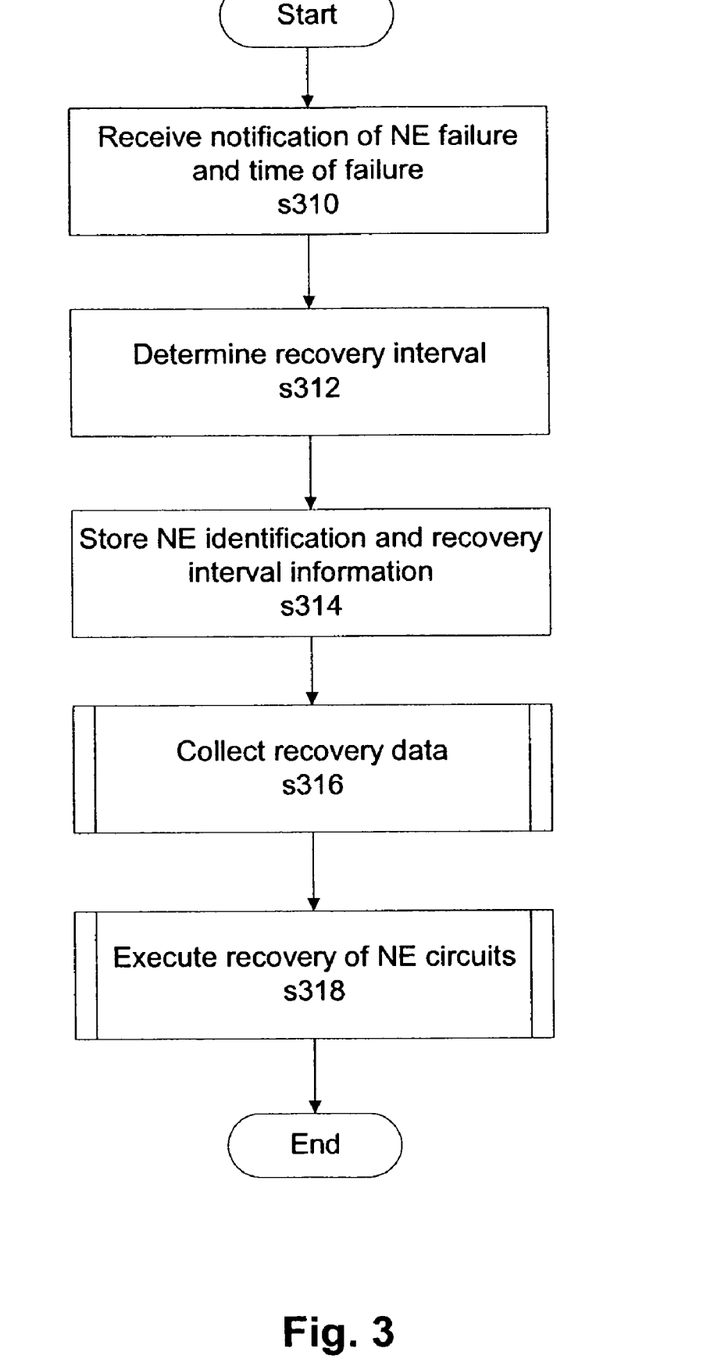
FIG. 3 shows an exemplary flowchart of the network element recovery process, according to an aspect of the present disclosure.

Once the identity of the NE and the time of the failure are known, a recovery interval is determined at step s312, in order to isolate the circuits within the failed NE that were provisioned during the recovery interval. In particular, circuits provisioned after the latest back-up of data from the NE are targeted for recovery. For example, the remote terminal 250 routinely uploads information regarding all of its provisioned circuits to an EMS (not pictured), which thus provides back-up data, as a practical matter, relating to these circuits up to the time of the most recent upload. The circuits provisioned (e.g., added, deleted or changed) after the last upload to the EMS have no back-up, and must therefore be recovered. For example, if the remote terminal 250 uploaded circuit information to the EMS at 1:00 p.m., and a failure occurs at 1:50 p.m., the recovery period is determined to be the 50 minutes between 1:00 p.m. and 1:50 p.m., so that the circuits provisioned during that time period are targeted for recovery. In other words, any circuits provisioned in the NE prior to 1:00 p.m. can be reprovisioned using the existing EMS back-up data, and provisioning attempts after 1:50 p.m. were not successful, so reprovisioning is not necessary. Relevant information, such as a list of the isolated circuits to be recovered (e.g., based on TID), the recovery period and the requester, are then stored in the Recovery Request Table 212 at step s314.

To implement the recovery process, recovery data must be collected, for example, by the Database Recovery Program 214, indicated by the process of step s316. The data collection process is depicted in the exemplary flowchart of FIG. 4, according to an embodiment of the present disclosure. In particular, at step s410, relevant identification information relating to the failed NE (e.g., RT 250) and the associated recovery interval are retrieved by the Database Recovery Program 214 from the Recovery Request Table 212. The Recovery Request Table 212 includes, for example, an entry for each TID to be recovered, the time frame of the recovery and the requester, as discussed above.

Figure 4:
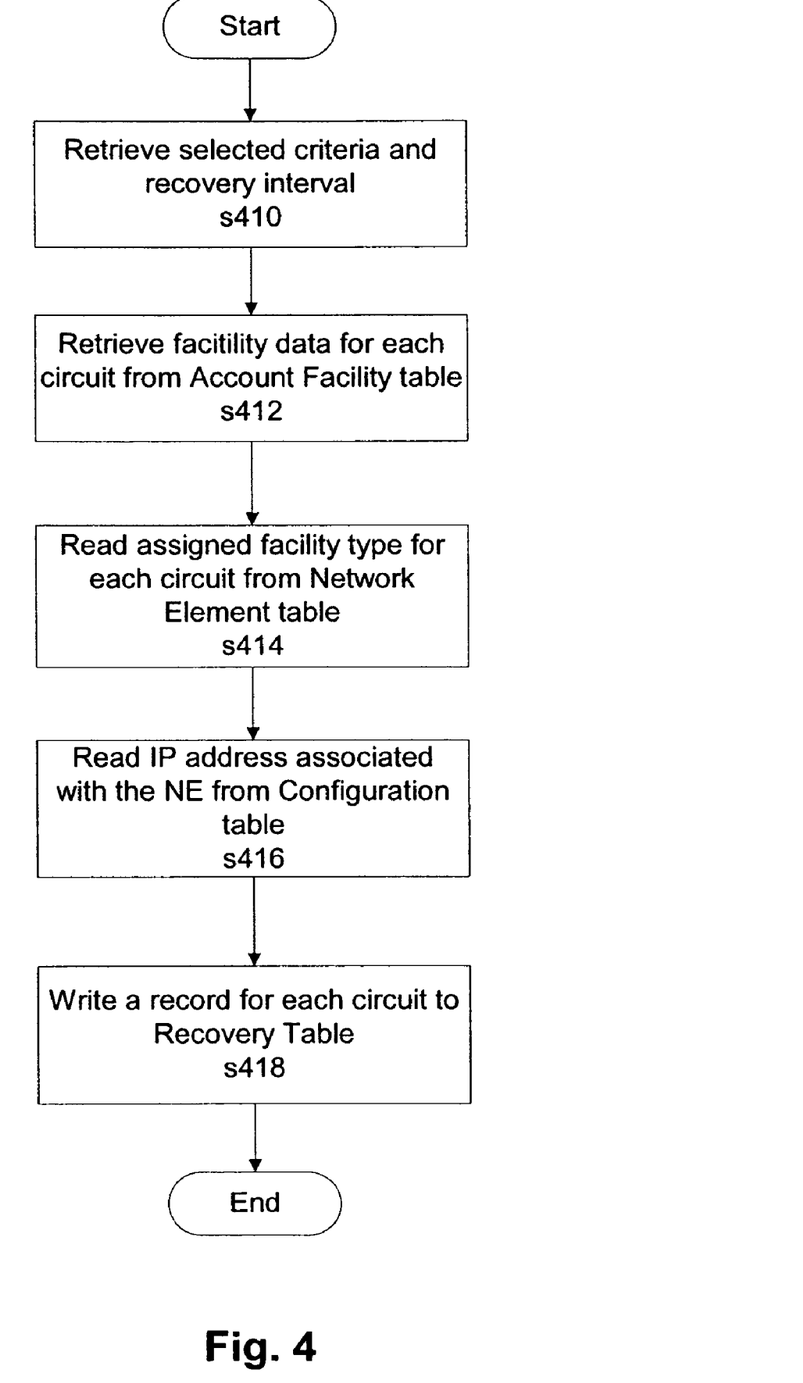
FIG. 4 shows an exemplary flowchart of the initial steps of the network element recovery process, according to an aspect of the present disclosure.

At step s412, facility data for each circuit of the failed NE is retrieved from the Account Facility Table 220, which contains data relating to all provisioned circuits in the network. The Account Facility Table 220 includes, for example, the facility assignment for each circuit, including the TID and access identifier (AID), which uniquely identifies the channel, shelf, card and/or port within the NE. The table also includes cross connection information, such as the virtual path indicator (VPI) and the virtual channel indicator (VCI) associated with the AID, and the uplink VPI and VCI associated with the network-side egress port of the NE. The Account Facility Table 220 can also include a DMT profile identifier, the date/time when each circuit was activated, and the alternate exchange carrier number (AECN), which identifies the carrier company associated with the circuit.

At step s414, an assigned facility type for each circuit is read from the Network Element Table 216, which is used to determine the correct interface provisioning protocol for the NE. The Network Element Table 216 includes, for example, the type of each NE (and its corresponding controlling network element (e.g., COT or EMS), such as the identity of the actual product, the EMS category and/or the vendor. At step s416, the IP address of the controlling network element corresponding to the failed NE is read from the Configuration Table 218. The data is consolidated by the Database Recovery Program 214, with respect to the circuits that need to be recovered, and recorded in the Recovery Table 222 at step s418. In an embodiment, the status of each circuit included in the Recovery Table 222 is set to "P," representing "pending."

Once the recovery data has been collected, the recovery is executed by the process indicated by step s318 of FIG. 3, using a Recovery Utility, according to an embodiment of the present disclosure. Of course, the specific Recovery Utility used depends on the NE being recovered. For example, Recovery Utility (1) 230 would recover RTs 250 and 251, Recovery Utility (2) 232 would recover RTs 252, 253 and 254, and Recovery Utility (n) 234 would recover RT 255.

Figure 5:
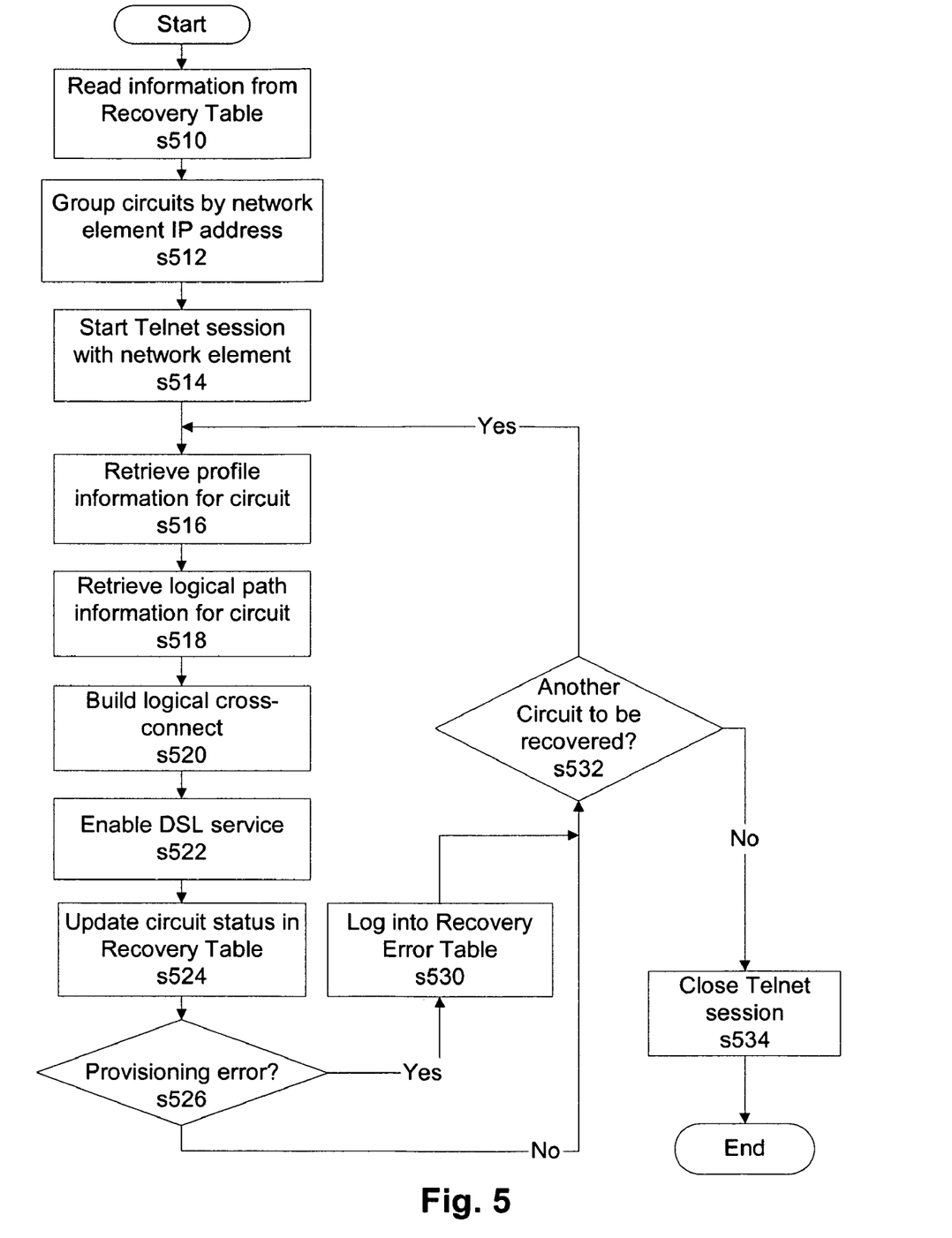
FIG. 5 shows an exemplary flowchart of the reprovisioning steps of the network element recovery process, according to an aspect of the present disclosure.

FIG. 5 is an exemplary flowchart showing the recovery process as implemented, for example, by the Recovery Utility (1) 230, according to an embodiment. In alternative embodiments, multiple copies of a recovery utility for a particular NE may operate separately and be implemented, for example, by any of the Recovery Utilities 230-234. At step s510, the Recovery Utility (1) 230 reads the stored recovery information from the Recovery Table 222. For example, the Recovery Table 222 contains an entry for each circuit to be recovered, and includes the corresponding TID and AID, the IP address of the controlling COT, EMS or other controlling network element, the AECN, the downlink VPI and VCI associated with the AID, the uplink VPI and VCI associated with the egress port, and the DMT profile identifier, as discussed above. In an embodiment, the Recovery Utility (1) 230 is able to communicate with multiple types of NEs and associated controlling network elements (e.g., COT 240, COT 241, COT 243 and EMS 242), depending on the types of NE and controlling network elements (e.g., based on the corresponding vendor platforms), using different protocols.

At step s512, the Recovery Utility (1) 230 groups the circuits by their respective controlling network element IP addresses. This enables the Recovery Utility (1) 230, for example, to efficiently recover all of the circuits within one failed NE during a single communication session. It further enables recovery of all of the circuits of additional failed NEs controlled by the same controlling network element, during the same communication session. For example, if both RT 250 and RT 251 experienced failures, the targeted circuits from both of these RTs would be grouped in accordance with the IP address of their common controlling network element, COT 240. Similarly, if RTs 252, 253 and 254 experienced failures, the targeted circuits would be grouped in accordance with the IP address of COT 241. Although only RT 252 is directly connected to the COT 241, while RTS 253 and 254 are sequentially chained from RT 252, the circuit identification, grouping and recovery would not be changed, as a practical matter.

At step s514, a Telnet session with one of the controlling network elements, such as the COT 240, is initiated using the IP address. In alternative embodiments, any type of network communication session may be used to connect the Recovery Utility (1) 230 and the COT 240, including, for example, an SMNP session. Also, the sessions may be established using different communication protocols. The circuits provisioned in the failed NE during the recovery interval are recovered sequentially through the Telnet session with the controlling network element. In an embodiment, the Recovery Utility (1) 230 first determines whether the originally provisioned data is present for each circuit, to avoid attempting to reprovision a circuit that survived the NE failure, thus already having associated provisioning data.

As shown in the depicted embodiment, the service profile (e.g., DMT parameters) for each circuit are retrieved at step s516, for example, from the Account Profile Table 226, which contain the latest set of DMT parameters pertaining to the circuit. The DMT parameters represent the service in effect at the time of the failure for the subscriber serviced by the particular circuit. The DMT parameters are needed so the circuit can be reprovisioned according to the same DMT parameters.

Also, data relating to the logical path through the NE, such as the circuit's VPI and VCI corresponding to the network side port and the VPI and VCI corresponding to the subscriber side port of the NE, are retrieved at step s518. For example, in an embodiment, the uplink port VPI and VCI for a circuit may be determined using the cross-connect (RTRV-CRS-VC) command. The logical cross-connect for the circuit is then built at step s520, based in part on the uplink port information and additional cross-connect information stored in the Recovery Table 222, such as the VPI and VCI for the AID. In an embodiment, the Recovery Utility 240 constructs and issues the cross-connect (ENT-CRS-VC) command to establish the logical data path of the circuit within the RT 250.

Using the DMT parameters and the cross-connect data, the DSL service may be enabled at step s522. In an embodiment, the Recovery Utility 240 constructs and issues the edit ADSL (ED-ADSL) command, which defines the ADSL service and sets the circuit's primary service state to "in service" to complete the reprovisioning of that circuit. The circuit status is updated in the Recovery Table 222 at step s524.

If an error occurs anywhere throughout the reprovisioning process for the circuit depicted by steps s516 through s524, as determined at step s526, the error is logged, for example, into the Recovery Error Table 224 at step s530. The Recovery Error Table 224 accordingly contains an entry for each circuit that erred, and was thus not recovered during the reprovisioning process. The errors are tracked and may require repeated attempts at automated reprovisioning or manual reprovisioning in order to complete the recovery of these circuits. In an embodiment, the Recovery Utility (1) 230 recognizes the error and the circuit that encountered the error during reprovisioning, and automatically resets the information that causes the error, so that another recovery effort is attempted and the circuit can be properly reprovisioned. Once the error has been logged, it is determined whether there are additional circuits to be recovered at step s532, discussed below. Although depicted at the end of the reprovisioning process, the error detection and logging may actually occur at any stage of the recovery process, without affecting the scope or spirit of the present disclosure.

Referring back to step s526, when there has been no error, the process proceeds to step s532, at which it is determined whether there are additional circuits that need to be recovered through the controlling network element (e.g., the COT 240), with which the current Telnet session is established. If YES, then steps s516 through s526 are repeated in order to reprovision the next circuit. If NO, then the Telnet session is closed at step s534 and the recovery process for the failed NE (e.g., RT 250) is complete. Of course, the process may be repeated through Telnet sessions with other controlling network elements to the extent necessary to recover all circuits from additional failed NEs, if any.

In an embodiment, a limited number of circuits are recovered during a predetermined timeframe, in order to avoid overwhelming the provisioning process. For example, based on the provisioning capabilities of the network, the Recovery Utility (1) 230 may fully reprovision only ten circuits at a time, each of which may take up to a minute to reprovision. This avoids, for example, the system failing due to an extensive backlog of circuits queued for reprovisioning.

As stated above, in alternative embodiments, the recovery process is implemented through a controlling network element other than a COT. For example, if RT 255 experienced a failure, the Recovery Utility (n) 234 would establish a Telnet or other communications session with the EMS 242, rather than directly with the COT 243. However, regardless of the controlling network element used, the reprovisioning would occur substantially as indicated by FIG. 5.

Also, alternative embodiments provide partial recovery of failed NE and/or circuits within the failed NE. For example, the recovery may be limited to a physical subset of a failed NE. In other words, if only a physical portion of a NE fails, such as a particular shelf or card, the recovery can be focused on circuits implemented by that shelf or card, as opposed to all circuits within the NE. Likewise, the recovery may be limited to a logical subset of the failed NE. For example, the recovery can be limited to reprovisioning either the cross connections or the DMT parameters of the targeted circuits, but not both. To implement a partial recovery, additional information regarding the failure must be provided initially. For example, at step s310, an identifier indicating the actual shelf or card within the NE that has failed will be provided, along with the notice and time of the failure. This information would likewise be stored in the Recovery Request Table 212 at step s314 of FIG. 3, and retrieved by the Database Recovery Program 214 at step s410 of FIG. 4 during the recovery process. Then, the Recovery Utility (1) 230, for example, would limit the targeted circuits accordingly, during the reprovisioning.

Similarly, in the case where only cross-connections are being recovered, for example, an indication of the same would be provided to the Recovery Utility (1) 230 from the Recovery Table 222 at step s510. Accordingly, the Recovery Utility (1) 230 would skip step s516 for each of the targeted circuits during the reprovisioning process. Likewise, when only DMT parameters are being recovered, an appropriate indication would be provided to the Recovery Utility (1) 230 from the Recovery Table 222 at step s510, and the Recovery Utility (1) 230 would skip steps s518 and s520 for each of the targeted circuits. Thus, aspects of the disclosure permit efficient, full or partial recovery of failed NEs throughout a network, regardless of the timing or existence of data backups.

Although FIGS. 3-5 depict a particular sequence of steps, it is understood that the sequence is exemplary to an embodiment, and is not intended to be limiting. For example, in alternative embodiments, the order of the steps may differ, or the various steps may occur simultaneously, without affecting the scope or spirit of the disclosure. Also, although depicted linearly, the various embodiments may be implemented through object oriented programming techniques.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A method for recovering at least one circuit of a network element in a communications network, the method comprising:
    determining a recovery interval in response to a failure occurring in the network element, wherein the determining a recovery interval includes determining a time of the failure of the network element, determining a time of a most recent back-up of the network element prior to the failure of the network element, and identifying the recovery interval as the time period between the time of the most recent back-up of the network element prior to the failure of the network element and the time of failure of the network element;
    collecting recovery data relating to at least one circuit provisioned in the network element during the recovery interval to support a network service, the recovery data comprising identification data and lost provisioning data that resulted from the at least one circuit provisioned in the network element during the recovery interval;
    establishing a connection with the network element based on the identification data; and
    reprovisioning the at least one circuit based on the lost provisioning data.

2. The method according to claim 1, further comprising:
    detecting whether an error occurred while reprovisioning the at least one circuit; and logging the detected error.

3. The method according to claim 1, further comprising:
    confirming that preexisting provisioning data relating to the at least one circuit is not in the network element prior to reprovisioning the at least one circuit; and
    reprovisioning the at least one circuit when the preexisting provisioning data is not in the network element.

4. The method according to claim 1, in which collecting recovery data relating to the at least one circuit comprises retrieving the lost provisioning data from a plurality of databases in the communications network.

5. The method according to claim 4, in which the lost provisioning data comprises a set of discrete multi-tone parameters defining the service and cross-connection data defining a plurality of ports on the network element.

6. The method according to claim 5, in which reprovisioning the at least one circuit comprises reprovisioning at least one of the set of discrete multi-tone parameters and the cross-connection data.

7. The method according to claim 1, in which the identification data comprises an address of a controlling network element that implements provisioning of the network element.

8. The method according to claim 7, in which the controlling network element address comprises an IP address.

9. The method according to claim 8, in which establishing the connection with the network element comprises establishing a Telnet session with the controlling network element using the IP address.

10. A method for recovering provisioned services in at least one network element that experienced a failure that resulted in lost provisioning data in the network element, the lost provisioning data resulting from the at least one network element provisioned during a recovery interval, the method comprising:
    retrieving recovery data from a recovery database relating to at least one circuit provisioned in a portion of the network element during a recovery interval, wherein the recovery interval is identified as the time period between the time of a most recent back-up of the network element prior to the failure of the network element and the time of the failure of the network element, and wherein the recovery data comprises identification data and the lost provisioning data collected from at least one network provisioning database and stored in the recovery database;
    establishing a connection with the network element based on the identification data; and
    reprovisioning at least a portion of the at least one circuits based on the lost provisioning data.

11. The method according to claim 10, in which the lost provisioning data comprises at least one of a set of discrete multi-tone parameters and cross-connection data for the at least one circuit.

12. The method according to claim 11, in which reprovisioning the portion of the at least one circuit comprises reprovisioning the set of discrete multi-tone parameters.

13. The method according to claim 11, in which reprovisioning the portion of the at least one circuit comprises reprovisioning the cross-connection data.

14. The method according to claim 10, in which the portion of the network element comprises a shelf within the network element.

15. The method according to claim 10, in which the portion of the network element comprises a card within the network element.

16. The method according to claim 10, in which the identification data comprises an IP address of a controlling network element associated with the network element, and establishing the connection with the network element comprises establishing a Telnet session using the IP address of the associated controlling network element.

17. The method according to claim 16, further comprising:
    grouping the at least one circuit to be recovered in accordance with the IP address of the associated controlling network element, and reprovisioning the at least one circuit during the Telnet session.

18. A computer readable medium storing a computer program for recovering provisioned services in at least one network element that experienced a failure that resulted in lost provisioning data in the network element, the lost provisioning data resulting from the last least one network element provisioned during a recovery interval, the computer readable medium comprising:
    a retrieving code segment that retrieves recovery data from a recovery database relating to at least one circuit provisioned in a portion of the network element during the recovery interval, wherein the recovery interval is identified as the time period between the time of a most recent back-up of the network element prior to the failure of the network element and the time of the failure of the network element, and wherein the recovery data comprises identification data and the lost provisioning data collected from at least one network provisioning database and stored in the recovery database;

a connecting code segment that establishes a connection with the network element based on the identification data; and a reprovisioning code segment that reprovisions at least a portion of the at least one circuit based on the lost provisioning data.

19. The computer readable medium according to claim 18, in which the connecting code segment establishes the connection with the network element by establishing a Telnet session with a controlling network element associated with the network element using the identification data.

20. The computer readable medium according to claim 19, further comprising:

a grouping code segment that groups the at least one circuit to be recovered in accordance with the identification data relating to the controlling network element, wherein the reprovisioning code segment reprovisions the at least one circuit during the Telnet session.

21. A system for recovering a failed network element in a communications network, the system comprising:

a first database comprising information representing a plurality of subscriber circuits;

a second database comprising information representing a plurality of profiles that define a corresponding plurality of services, the plurality of services corresponding to the plurality of subscriber circuits;

a first processor that retrieves recovery information from the first database and the second database in response to a failure of a network element, and that writes the recovery information to a third database, the recovery information corresponding to at least one circuit provisioned in the network element during a recovery interval, wherein the recovery interval is identified as the time period between the time of a most recent back-up of the network element prior to the failure of the network element and the time of the failure of the network element; and a second processor that retrieves the recovery information from the third database, establishes a communication session with the failed network element, and reprovisions the at least one circuit in accordance with the recovery information.

* * * * *